(12) United States Patent
Ishikawa

(10) Patent No.: US 6,906,686 B2
(45) Date of Patent: Jun. 14, 2005

(54) APPARATUS FOR DISPLAYING A STEREOSCOPIC TWO-DIMENSIONAL IMAGE AND METHOD THEREFOR

(75) Inventor: Masaru Ishikawa, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 794 days.

(21) Appl. No.: 09/801,055

(22) Filed: Mar. 8, 2001

(65) Prior Publication Data

US 2001/0022563 A1 Sep. 20, 2001

(30) Foreign Application Priority Data

Mar. 10, 2000 (JP) ........................................ 2000-066981

(51) Int. Cl.$^7$ .............................................. G02F 1/335
(52) U.S. Cl. ............................ 345/1.1; 345/1.2; 345/5; 345/905; 348/51; 348/54; 348/59; 359/462; 359/621; 359/622; 382/154; 382/276; 382/285; 382/295
(58) Field of Search .............................. 345/1.1, 1.2, 5, 345/905, 6, 7, 9, 55; 348/51, 54, 59, 42; 359/462, 621, 622, 463, 466, 467; 382/154, 276, 285, 295; 349/15

(56) References Cited

U.S. PATENT DOCUMENTS

| | | | | | |
|---|---|---|---|---|---|
| 4,754,327 A | * | 6/1988 | Lippert | ........................ | 348/50 |
| 5,142,357 A | * | 8/1992 | Lipton et al. | ................. | 348/48 |
| 5,592,215 A | * | 1/1997 | Kuga | .......................... | 348/51 |
| 5,754,280 A | * | 5/1998 | Kato et al. | .................. | 356/3.06 |
| 5,764,280 A | * | 6/1998 | Bloom et al. | .................. | 348/53 |
| 5,798,864 A | * | 8/1998 | Sekiguchi | ..................... | 359/559 |
| 5,850,352 A | * | 12/1998 | Moezzi et al. | ............... | 345/419 |
| 5,956,001 A | * | 9/1999 | Sumida et al. | ................ | 345/55 |
| 6,031,941 A | * | 2/2000 | Yano et al. | .................. | 382/276 |
| 6,049,352 A | * | 4/2000 | Allio | ............................ | 348/42 |
| 6,069,650 A | * | 5/2000 | Battersby | ...................... | 348/59 |
| 6,246,451 B1 | * | 6/2001 | Matsumura et al. | ........... | 349/15 |
| 6,337,721 B1 | * | 1/2002 | Hamagishi et al. | ............ | 349/15 |
| 6,407,724 B2 | * | 6/2002 | Waldern et al. | ................. | 345/8 |

\* cited by examiner

Primary Examiner—Bipin Shalwala
Assistant Examiner—Vincent E. Kovalick
(74) Attorney, Agent, or Firm—Morgan, Lewis & Bockius LLP

(57) ABSTRACT

An apparatus for displaying a stereoscopic two-dimensional picture includes a display unit having a flat image display screen for displaying a two-dimensional picture containing a stereoscopic image and an image transmitting panel placed parallel to and apart from the image display screen. The image transmitting panel has a microlens array of a plurality of lenses and an effective area larger than that of the stereoscopic image contained in the two-dimensional picture, and a lens frame area surrounding a perimeter of the effective area of the microlens array. The image transmitting panel generates an image-formation plane for displaying a real image of the two-dimensional picture in a space located on an opposite side to the display unit with respect to the microlens array. The apparatus also includes a stereoscopic frame for defining a space for accommodating the image-formation plane.

13 Claims, 6 Drawing Sheets

APPARATUS FOR DISPLAYING A STEREOSCOPIC TWO-DIMENSIONAL IMAGE AND METHOD THEREFOR

BACKGROUND OF THE INVENTION

1. Field of the Invention

The present invention relates to an apparatus for displaying a two-dimensional picture containing a stereoscopic image and a method therefor.

2. Description of the Related Art

There is a use of an apparatus for displaying an image for exhibiting the displayed content as a part of an interior decoration. For example, a display device that realizes an imaginary aquarium is already on the market in which a glass tank containing water or water tank having glass sides is arranged on the front face screen of a cathode-ray-tube displaying an image of living aquatic animals or plants such as swimming tropical fishes.

Under the influence of the glass tank filled with water arranged in front screen of the CRT, such a display device displays tropical fishes or the like as if they are really swimming in the water tank, as compared with an image of the tropical fishes merely displayed on the screen.

However, a displayed image is flat after all. The fishes are swimming in the image of water on the screen and they never appear to be swimming in the water in the glass tank.

In order to display fishes as if they are really swimming in the water in the glass tank, the reproduction of a stereoscopic image should be considered. There is a polarizing method wherein the viewer wears a pair of polarizing glasses and then observes the right and left parallax images corresponding to the polarized states thereof different from each other. This method requires the viewer to wear a pair of polarizing glasses. The wearing of polarizing glasses is troublesome.

OBJECT AND SUMMARY OF THE INVENTION

The present invention is made to overcome such a conventional problem and therefore an object of the present invention is to provide an apparatus for displaying an image which solves the problem and is capable of stereoscopic display of a dynamic image using simple configuration.

An apparatus for displaying a stereoscopic two-dimensional picture according to the present invention comprises:

a display unit having a flat image display screen for displaying a two-dimensional picture containing a stereoscopic image;

an image transmitting panel placed parallel to and apart from said image display screen, the image transmitting panel having a microlens array of a plurality of lenses and an effective area larger than that of the stereoscopic image contained in said two-dimensional picture, and a lens frame area surrounding a perimeter of the effective area of said microlens array, so that said image transmitting panel generates an image-formation plane for displaying a real image of said two-dimensional picture in a space located on an opposite side to said display unit with respect to said microlens array; and a stereoscopic frame for defining a space for accommodating said image-formation plane.

In one aspect of the apparatus for displaying a stereoscopic two-dimensional picture according to the invention, said microlens array is a micro-convex-lens board formed of a plurality of lens systems each consisting of a pair of convex lenses coaxially arranged, the lens systems being arranged in the two-dimensional manner so that the optical axes of the lens systems are parallel to one another.

In a further aspect of the apparatus for displaying a stereoscopic two-dimensional picture according to the invention, said microlens array forms an erect real image of the two-dimensional picture.

In a still further aspect of the apparatus for displaying a stereoscopic two-dimensional picture according to the invention, said lens frame area is a dark color area.

In still another aspect of the invention, the apparatus for displaying a stereoscopic two-dimensional picture further comprises a supporting member supporting said lens frame area and defining a distance between the image display screen and the image transmitting panel, at least an optical path side of the supporting member being a dark color.

In a still further aspect of the invention, the apparatus for displaying a stereoscopic two-dimensional picture further comprises a picture signal supply circuit for generating a picture signal for exhibiting an image portion other than stereoscopic images which is filled with a dark color in the two-dimensional picture to be reproduced and supplying the picture signal to said display unit.

In a further aspect of the invention, the apparatus for displaying a stereoscopic two-dimensional picture further comprises an image-formation-spot indicating unit placed adjacent to said image-formation plane in the stereoscopic frame.

In still another aspect of the apparatus for displaying a stereoscopic two-dimensional picture according to the invention, said stereoscopic frame is a glass tank filled with water.

In a further aspect of the invention, the apparatus for displaying a stereoscopic two-dimensional picture further comprises a second display unit placed on a bottom side of the glass tank with water and having a second flat image display screen for displaying a two-dimensional picture containing a second stereoscopic image;

a second image transmitting panel placed parallel to and apart from said second image display screen, the second image transmitting panel having a microlens array of a plurality of lenses and an effective area larger than that of the stereoscopic image contained in said two-dimensional picture, and a lens frame area surrounding a perimeter of the effective area of said microlens array, so that said second image transmitting panel generates an image-formation plane for displaying a real image of said two-dimensional picture in a space located on an opposite side to said second display unit with respect to said microlens array. In a further aspect of the invention, the apparatus for displaying a stereoscopic two-dimensional picture includes a display unit that includes:

a back-light illuminating unit;

a color liquid crystal display panel arranged so as to cover a whole surface of the back-light illuminating unit; and picture signal supply unit supplying a picture signal including two-dimensional picture data and stereoscopic image data to the color liquid crystal display panel.

In a further aspect of the invention, a method for displaying a stereoscopic two-dimensional picture according to the invention includes:

providing a display unit having a flat image display screen for displaying a two-dimensional picture containing a stereoscopic image;

arranging an image transmitting panel parallel to and apart from said image display screen, said image transmitting panel having a microlens array of a plurality of lenses and an effective area larger than that of the stereoscopic image contained in said two-dimensional picture, and a lens frame area surrounding a perimeter of the effective area of said microlens array; and arranging a stereoscopic frame for defining a space for accommodating said image-formation plane so that said image transmitting panel generates an image-formation plane for displaying a real image of said two-dimensional picture in a space located on an opposite side to said display unit with respect to said microlens array.

In one aspect of the invention, the method for displaying a stereoscopic two-dimensional picture further comprises a step of generating a picture signal for exhibiting an image portion other than stereoscopic images which is filled with a dark color in the two-dimensional picture to be reproduced and supplying the picture signal to said display unit.

In another aspect of the invention, the method for displaying a stereoscopic two-dimensional picture further comprises a step of placing an image-formation-spot indicating unit adjacent to said image-formation plane.

According to the present invention, by the microlens array, a erected real image contained in the two-dimensional picture is formed on the image-formation plane in the water tank without providing any diffuser such as a screen, because the microlens array is secured so that the image display screen displaying the two-dimensional picture containing the stereoscopic image coincides with the focal surface of the micro convex lens array on the object side. Consequently, a very simple configuration for the displaying apparatus can provide a stereoscopic exhibition of fishes swimming in the glass tank filled with water, making the image appear closer to a real aquarium. In addition, it is also possible to display stereoscopically the two-dimensional image containing the stereoscopic image using a very simple configuration.

DETAILED DESCRIPTION OF THE PREFERRED EMBODIMENTS

Several embodiments of apparatuses for displaying a two-dimensional picture containing a stereoscopic image according to the present invention will be described below with reference to the accompanying drawings.

Figure 1:
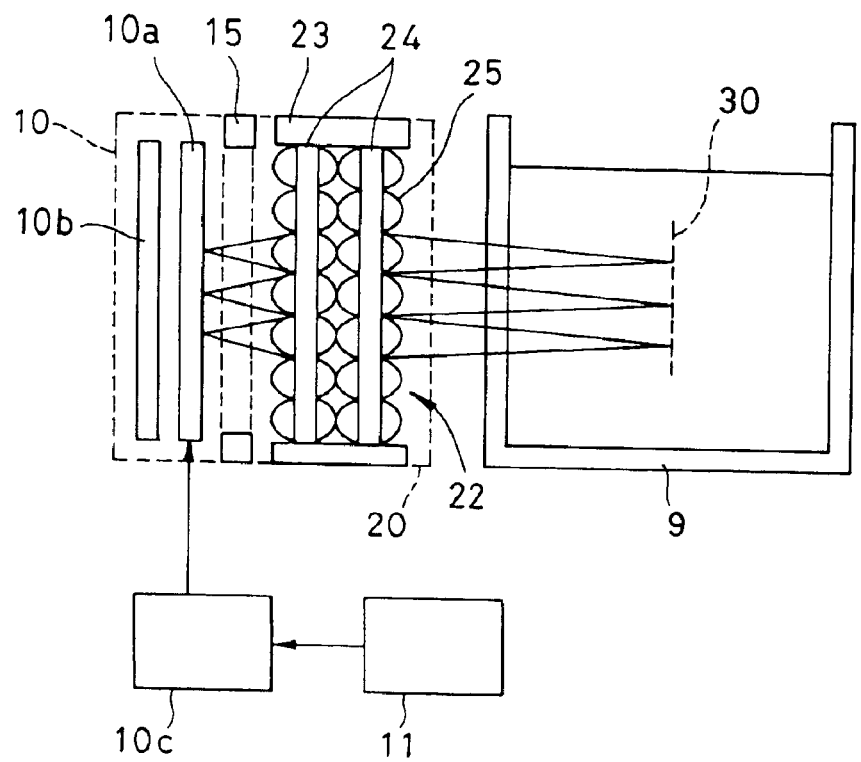
FIG. 1 is a schematic sectional view of a stereoscopic image displaying apparatus according to the present invention.

FIG. 1 is a sectional view of an apparatus for displaying a two-dimensional picture containing a stereoscopic image as a first embodiment. The apparatus comprises a display unit 10 such as a color liquid crystal display device (LCD) and an image transmitting panel 20 supported by a supporting member 15 which is fixed to the display unit. The image transmitting panel 20 generates an image-formation plane 30 in a space located on the opposite side of the LCD. The apparatus for displaying an image further comprises a stereoscopic frame 9 such as a glass tank filled with water therein for accommodating the image-formation plane 30. The stereoscopic frame 9 does not have to hold water therein so long as it partitions the space wherein the image-formation plane is accommodated.

The display unit 10 includes a flat image display screen for displaying the two-dimensional picture containing the stereoscopic image. The display unit is not limited to an LCD. For example, a CRT, a plasma display, or an organic electroluminescence display is also usable for the display unit in place of the LCD. In the case that the display unit 10 is an LCD, the LCD comprises a color liquid crystal display panel 10a having a flat image display screen, a back-light illuminating unit 10b, and a color liquid crystal drive circuit 10c connected to the liquid crystal display panel 10a and driving it. The drive circuit 10c is connected to a picture signal supply unit 11 which supplies a picture signal for the two-dimensional picture containing the stereoscopic image.

The image transmitting panel 20 comprises a microlens array 22 and a lens frame area 23, for example, a lens frame surrounding an effective area of the microlens array. The supporting member 15 supports the lens frame area 23 and defines a distance between the image display screen and the image transmitting panel. The image transmitting panel 20 is located parallel to and apart from the image display screen of the color liquid crystal display panel 10a. The microlens array 22 is an erecting optical system in which the stereoscopic two-dimensional picture appearing on the image display screen is transmitted to a front space as a real image whose spatial orientation and size are substantially identical to that of the picture to present the real image to the view. The microlens array 22 has an effective area larger than that of the stereoscopic image contained in the two-dimensional picture. In this embodiment, the effective area of the microlens array 22 is the same as the area of the image display screen of the color liquid crystal display panel 10a. The lens frame area 23 is in a dark color such as black so as to make the existence of the microlens array less conspicuous to the viewer.

Figure 2:
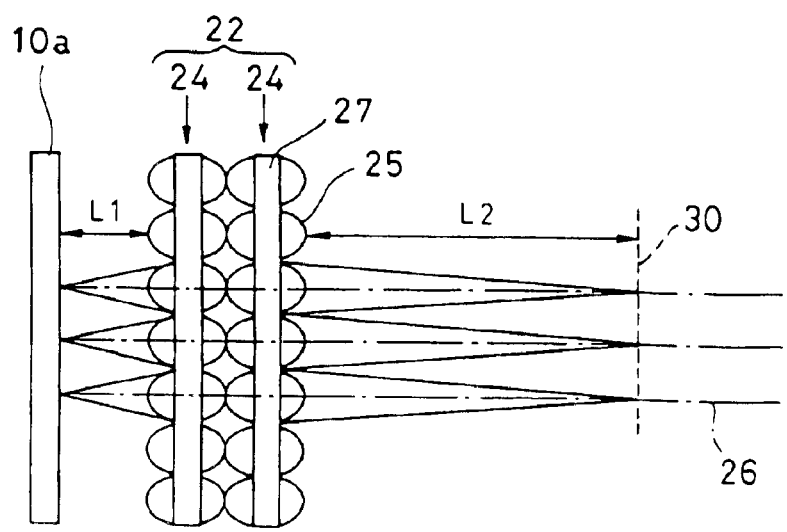
FIG. 2 is a partial sectional view of a microlens array of the stereoscopic image displaying apparatus according to the present invention.

The microlens array 22 comprises a plurality of microlenses arranged two-dimensionally. As is shown in FIG. 1, the microlens array 22 is a micro-convex-lens board formed by integrating every pair of lens-array half bodies 24 with a spacer. The micro-convex-lens board is formed of a plurality of lens systems. Each lens system includes of a pair of convex lenses coaxially arranged in the optical axes thereof. The lens systems are arranged in a two-dimensional manner so that the optical axes of the lens systems are parallel to one another. FIG. 2 is a sectional view of the microlens array 22 sectioned at a plane containing optical axes 26 of each convex lens 25. The convex lens 25, which is formed on the right side face of the lens-array half body 24 shown on the right side of the figure, has a curvature larger than that of other convex lenses. Distance L2, which is the distance between the focus of the lens-array half body 24 on the image side (image-formation plane 30) shown on the right side of the figure and the lens surface, is longer than distance L1, which is the distance between the color liquid crystal display panel 10a the lens-array half body 24 shown on the left side of the figure and the lens surface. Accordingly, the image-formation plane 30 is sufficiently distant from the image transmitting panel 20, making it possible for the apparatus to display a compact image by reducing the depth thereof. As shown in FIG. 2, each convex lens 25 has the same quality of material and shape. For example, the convex lenses 25 are formed to align adjoining each other in the form of a matrix on a transparent flat plate. The optical axis 26 of the convex lens 25 coincides with each other between a pair of adjacent half bodies 24 of the lens array. Although the material of the convex lens 25 and the transparent flat plate 27 is acrylic resin, the transparent flat plate may be made of glass.

The operation of the apparatus embodiment to display an image will be described below.

Figure 3:
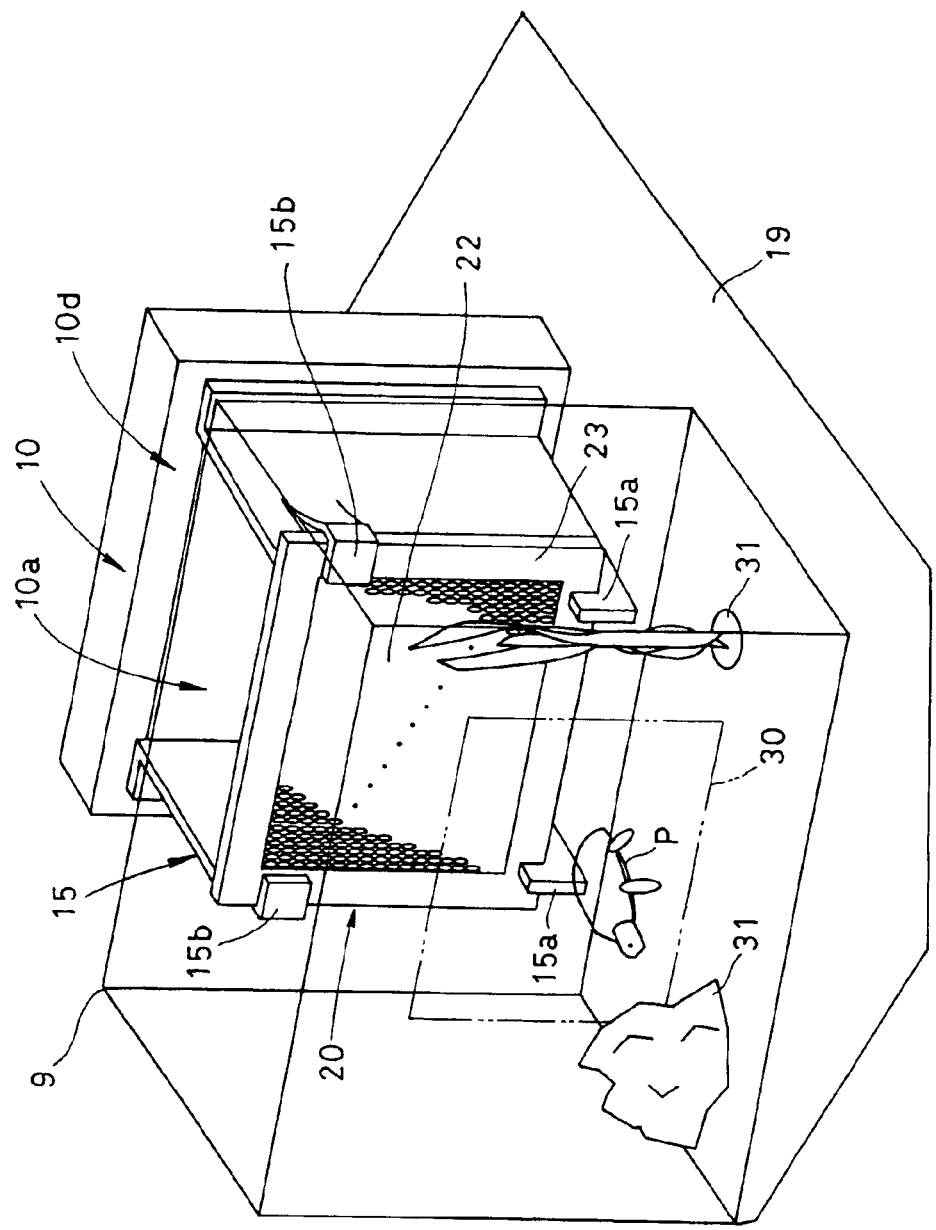
FIG. 3 is a schematic perspective view of the stereoscopic image displaying apparatus according to the present invention.

As shown in FIG. 3, the LCD 10 is arranged on a dark colored stage 19, such as a black color. The LCD 10 has a color liquid crystal display panel 10a for displaying a two-dimensional picture containing a stereoscopic image, with a perimeter 10d which is colored black. Supporting plates, being the supporting member 15, are fixed perpendicularly on the perimeter of the color liquid crystal display panel 10a of the LCD 10 so as to screen the field of vision in the horizontal direction. The supporting member 15, too, at least the inside thereof on the side of the color liquid crystal display panel 10a, is colored black. Provided on the free end of the supporting plates are carry units 15a at the lower end thereof, and spring units 15b at the upper part thereof, which are able to impart springiness in the horizontal direction opposing each other.

The lens frame area 23 of the image transmitting panel 20 is inserted in the clamped manner between the spring units 15b, and the image transmitting panel is mounted on the carry units 15a so as to be arranged parallel to and apart from the image display screen of the LCD 10. Because the lens frame area 23 is black, the supporting member 15 is concealed from the viewing side. The image display screens of the image transmitting panel 20 and the LCD 10 are previously arranged in a physical relationship wherein the image display screens are made to coincide with the focal surface of the microlens array 22 on the object side. In this manner, when the image of an object (stereoscopic image) is formed on the image display screen of the LCD 10, the image is formed on the focal surface on the image side, enabling a real image of the stereoscopic image to be viewed from the substantial optical axis direction. In this case, the side of the image display screen is the object side because the reproduced image is obtained from the stereoscopic image formed on the image display screen of the LCD 10.

The stereoscopic frame 9 such as a glass tank filled with water is then arranged so as to accommodate the generated image-formation plane 30 in the water.

The two-dimensional picture containing the stereoscopic image to be displayed can be perceived as a three-dimensional image, if the image portion other than the stereoscopic image such as the background is filled with a dark color such as black by using a known picture-signal processing method for bracketing the stereoscopic image according to the luminance level or color level. Such a processing makes only the stereoscopic image to be displayed (real image) seen to be standing out toward the viewer in the water tank in front, because the stereoscopic image surrounded by a dark color such as black, of the perimeter 10d of the color liquid crystal display panel 10a and the inside of the supporting member 15. As the subject of a stereoscopic image, a dynamic body such as a moving aquatic animal such as fish or the like is preferable to a static body.

Furthermore, the apparatus for displaying a stereoscopic two-dimensional picture may also include an image-formation-spot indicating unit i.e., a real body 31 placed adjacent to the image-formation plane. By arranging the real body 31, a viewer can stereoscopically perceive a stereoscopic two-dimensional picture, though he does not receive any parallax image information. The real body 31 is placed in the neighborhood i.e., before and behind the image-formation plane 30 with a real image P of the stereoscopic image generated thereon so as not to obstruct the optical path. The real body 31 near the real image P is to give the viewer an illusion as if the two-dimensional picture were a real three-dimensional image.

Figure 4:
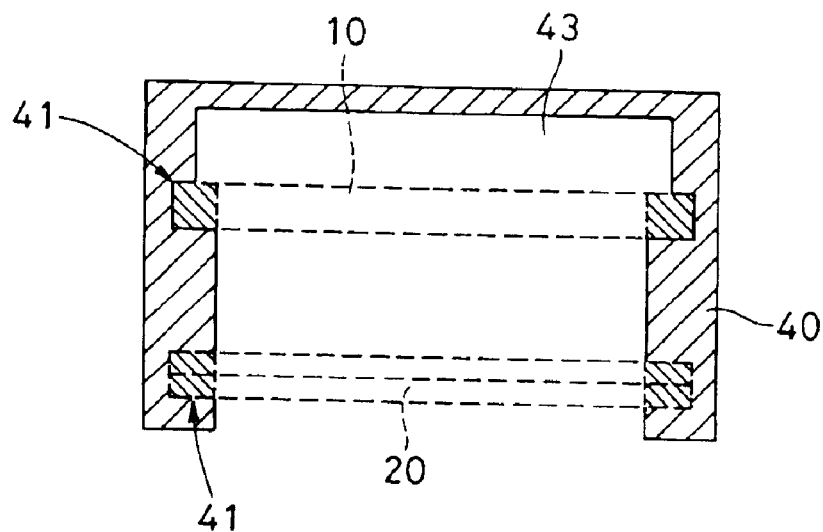
FIG. 4 is a sectional view along line A—A shown in FIG. 5.
Figure 5:
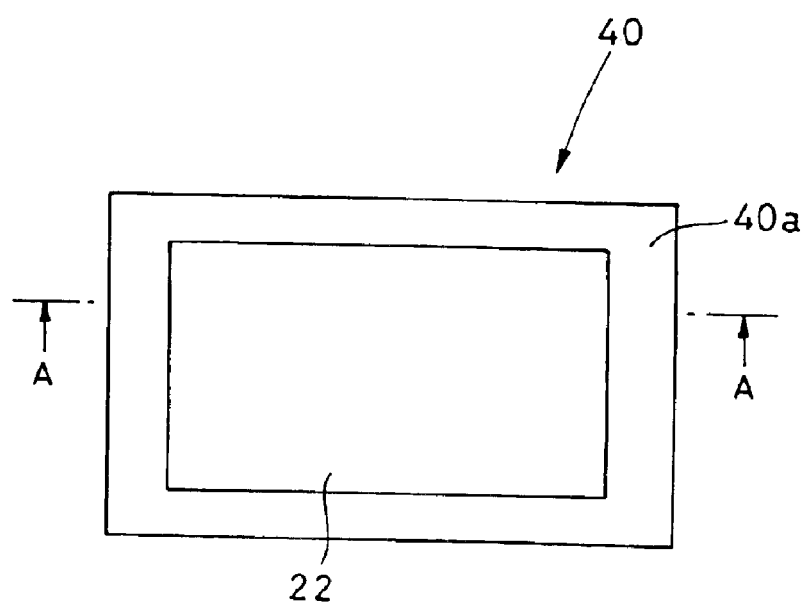
FIG. 5 is a front view of a stereoscopic image displaying

In the first embodiment above, the description has been given of the case wherein the image transmitting panel 20 is fixed to the perimeter of the color liquid crystal display panel 10a of the LCD 10 in a freely demountable manner with the supporting member 15. In addition to the first embodiment, FIGS. 4 and 5 show a second embodiment. It is possible to replace the supporting member 15 by an integral housing 40 as an expanded supporting member. The integral housing 40 surrounds the optical path and supports the side of the image transmitting panel 20. The internal surface of the housing 40 is colored a dark color such as black at least on the side of the optical path. It is preferable to make the width of the display screen of the color liquid crystal display panel 10a nearly equal to an effective width of the microlens array 22, that is, to make the effective areas of both almost the same. In order to realize this state, slit units 41 respectively corresponding to the thickness of the image transmitting panel 20 and the color liquid crystal display panel 10a are provided inside the integral housing 40, and each of them is interfitted so as to be fixed apart from each other by a predetermined distance. Owing to this configuration, it is unnecessary to color the lens frame area 23 in the perimeter of the microlens array 22 black. Instead, a front face 40a of the housing 40 is colored a dark color. It is also possible to provide a circuit housing unit 43 inside the integral housing 40 on the side of the back face of the color liquid crystal display panel 10a so as to house the drive circuit and other parts. A compact apparatus for displaying a stereoscopic image is realized with the configuration described above.

Although in the embodiments described above, one apparatus for displaying a stereoscopic two-dimensional image is provided on the side face of a glass tank filled with water, being the back face side, a plurality of apparatuses for displaying a stereoscopic two-dimensional image may be provided to the water tank.

Figure 6:
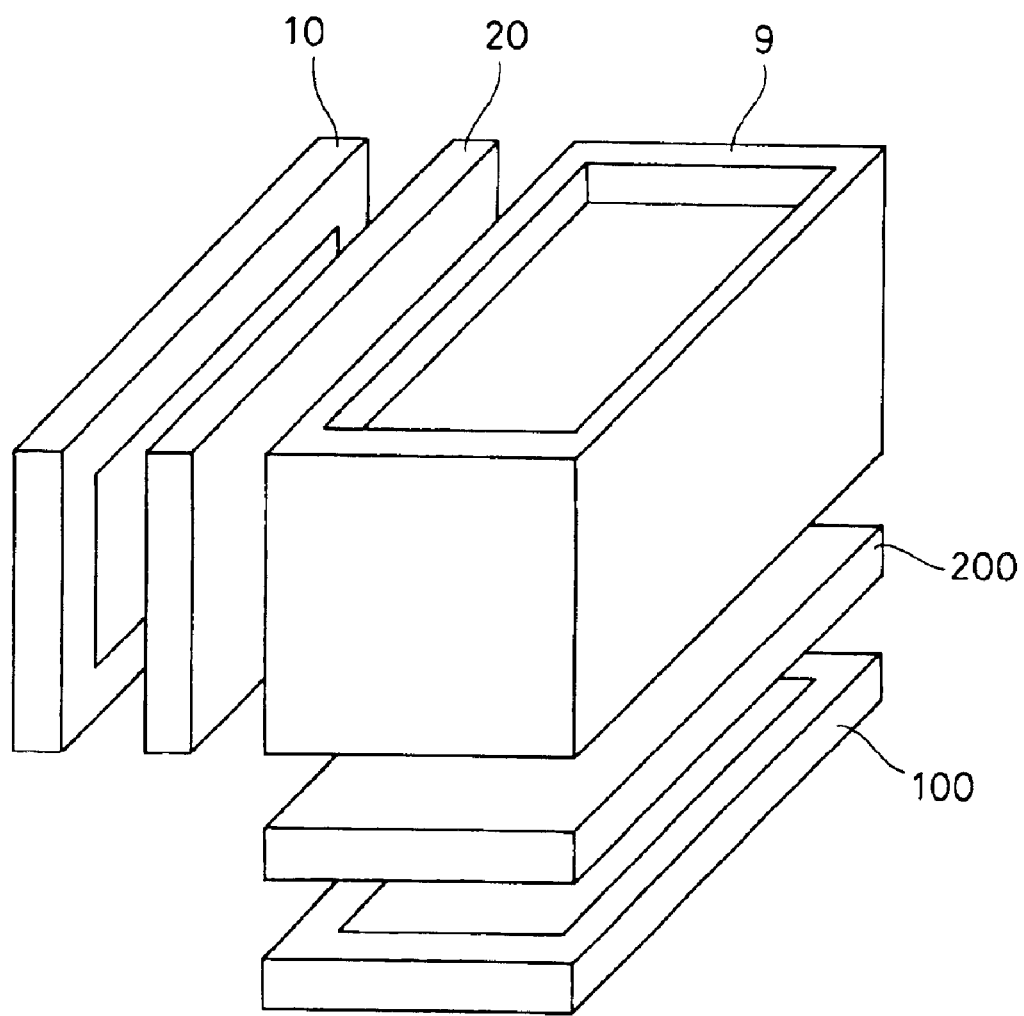
FIG. 6 is a schematic perspective view of an apparatus for displaying a stereoscopic image of still another embodiment according to the present invention.
Figure 7:
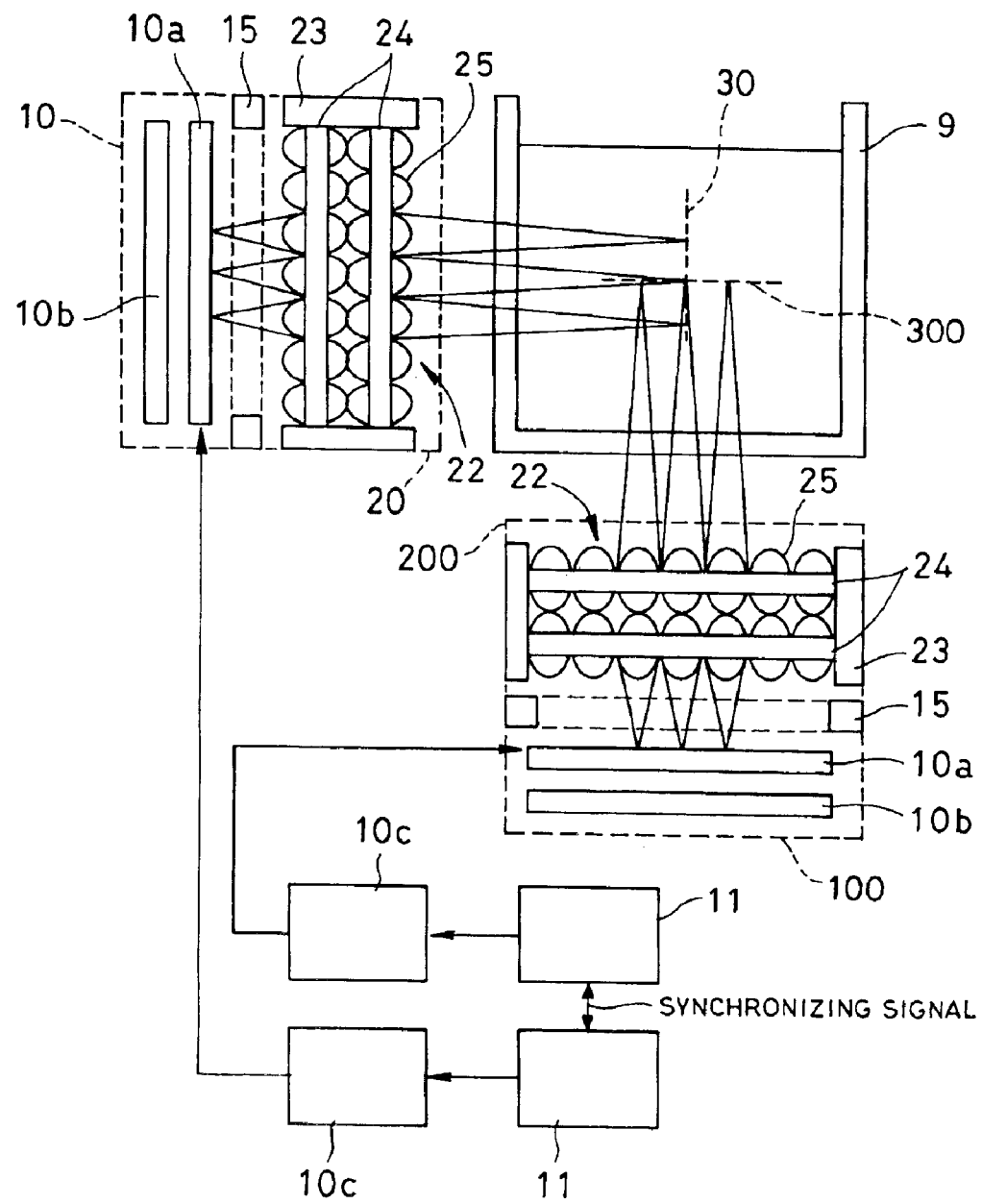
FIG. 7 is a schematic sectional view of an apparatus for displaying a stereoscopic image of still another embodiment according to the present invention.
Figure 8:
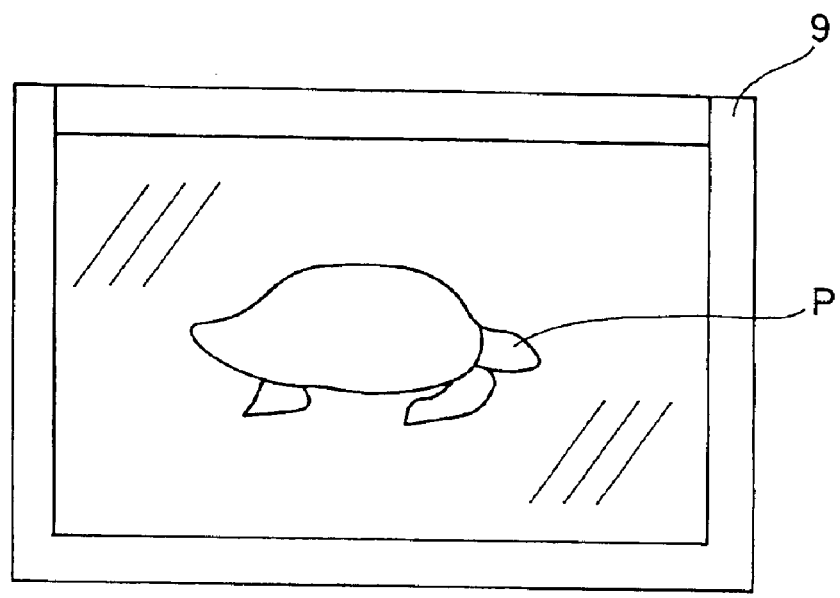
FIG. 8 is a side view of a water tank of an apparatus for displaying a stereoscopic image of still another embodiment according to the present invention.
Figure 9:
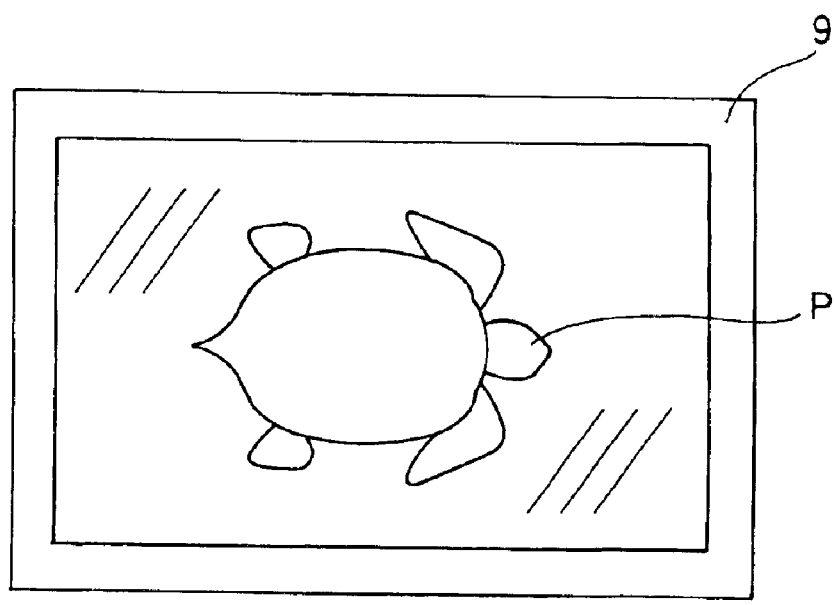
FIG. 9 is a top view of a water tank of an apparatus for displaying a stereoscopic image of still another embodiment according to the present invention.

FIGS. 6 and 7 show a third embodiment. A second display unit 100 and a second image transmitting panel 200 are arranged on the transparent bottom side of the glass tank 9 filled with water, in addition to the display unit 10 and the image transmitting panel 20 provided on the side face of the water tank. The same reference numerals given to the display unit 10 and the image transmitting panel 20, and to the second display unit 100 and the second image transmitting panel 200 show the same elements in the Figures. As shown in FIG. 7, a second image-formation plane 300 for displaying a real image of a second two-dimensional image generated in the space accommodate by the water tank by the second display unit 100 and the second image transmitting panel 200 is nearly perpendicular to the image-formation plane 30 generated in the space in the water tank by the display unit 10 and the image transmitting panel 20. The image signal supply units 11 are connected to the color liquid crystal drive circuits 10c of the liquid crystal panels of the display unit 10 and the second display unit 100 respectively. When the image signal supply units 11 are synchronized with each other so as to supply image signals for two-dimensional images containing stereoscopic images of a side and top views of the water tank, the real images appearing in the water tank moves as if it is one body whether viewed from the front of the water tank (FIG. 8) or from the top thereof (FIG. 9). Accordingly, the stereoscopic two-dimensional image is perceived by the viewer to be more stereoscopic.

The stereoscopic frame 9 is not limited to a glass tank filled with water. It may be a rectangular frame consisting of frame only with no walls, or a housing having transparent side faces. The housing can be used for a diorama, a stereoscopic display of an animation of a person, a vehicle, or the like with a set such as a miniature garden arranged therein.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. An apparatus for displaying a stereoscopic two-dimensional picture comprising:

a display unit having a flat image display screen for displaying a two-dimensional picture containing a stereoscopic image;

an image transmitting panel placed to and apart from said image display screen, the image transmitting panel having a microlens array of a plurality of lenses and an effective area larger than that of the stereoscopic image contained in said two-dimensional picture, and a lens frame area surrounding a perimeter of the effective area of said microlens array, so that said image transmitting panel generates an image-formation plane for displaying a real image of said two-dimensional picture in a space located on an opposite side to said display unit with respect to said microlens array; and a stereoscopic frame for defining a space for accommodating said image-formation plane.

2. An apparatus for displaying a stereoscopic two-dimensional picture according to claim 1, wherein said microlens array is a micro-convex-lens board formed of a plurality of lens systems each consisting of a pair of convex lenses coaxially arranged, the lens systems being arranged in the two-dimensional manner so that the optical axes of the lens systems are parallel to one another.

3. An apparatus for displaying a stereoscopic two-dimensional picture according to claim 2, wherein said microlens array forms an erect real image of the two-dimensional picture.

4. An apparatus for displaying a stereoscopic two-dimensional picture according to claim 1, wherein said lens frame area is a dark color area.

5. An apparatus for displaying a stereoscopic two-dimensional picture according to claim 1, further comprising a supporting member supporting said lens frame area and defining a distance between the image display screen and the image transmitting panel, at least an optical path side of the supporting member being a dark color.

6. An apparatus for displaying a stereoscopic two-dimensional picture according to claim 1, further comprising a picture signal supply circuit for generating a picture signal for exhibiting an image portion other than stereoscopic images which is filling with a dark color in the two-dimensional picture to be reproduced and supplying the picture signal to said display unit.

7. An apparatus for displaying a stereoscopic two-dimensional picture according to claim 1, further comprising an image-formation-spot indicating unit placed adjacent to said image-formation-plane in the stereoscopic frame.

8. An apparatus for displaying a stereoscopic two-dimensional picture according to claim 1, wherein said stereoscopic frame is a glass tank filled with water.

9. An apparatus for displaying a stereoscopic two-dimensional picture according to claim 1, further comprising:

a second display unit placed on a bottom side of the glass tank with water and having a second flat image display screen for displaying a two-dimensional picture containing a second stereoscopic image;

a second image transmitting panel placed parallel to and apart from said second image display screen, the second image transmitting panel having a microlens of a plurality of image contained in said two-dimensional picture, and a lens frame area surrounding a perimeter of the effective area of said microlens array, so that said second image transmitting panel generates an image-formation plane for displaying a real image of said two-dimensional picture in a space located on an opposite side to said second display unit with respect to said microlens array.

10. An apparatus for displaying a stereoscopic two-dimensional picture according to claim 1, wherein said display unit comprises;

a back-light illuminating unit;

a color liquid crystal display panel arranged so as to cover a whole surface of the back-light illuminating unit; and picture signal supply unit supplying a picture signal including two-dimensional picture data and stereoscopic image data to the color liquid crystal display panel.

11. A method for displaying a stereoscopic two-dimensional picture comprising the steps of:

providing a display unit having a flat image display screen for displaying a two-dimensional picture containing a stereoscopic image;

arranging an image transmitting panel parallel to and apart from said image display screen, said image transmitting panel having a microlens array of a plurality of lenses and an effective area larger than that of the stereoscopic image contained in said two-dimensional picture, and a lens frame area surrounding a perimeter of the effective area of said microlens array; and arranging a stereoscopic frame for defining a space for accommodating an image-formation plane so that said image transmitting panel generates said image-formation plane for displaying a real image of said two-dimensional picture in a space located on an opposite side to said display unit with respect to said microlens array.

12. A method for displaying a stereoscopic two-dimensional picture according to claim 11, further comprising a step of generating a picture signal for exhibiting an image portion other than stereoscopic images which is filled with a dark color in the two-dimensional picture to be reproduced and supplying the picture signal to said display unit.

13. A method for displaying a stereoscopic two-dimensional picture according to claim 11, further comprising a step of placing an image-formation-spot indicating unit adjacent to said image-formation plane.

* * * * *

UNITED STATES PATENT AND TRADEMARK OFFICE
CERTIFICATE OF CORRECTION

PATENT NO. : 6,906,686 B2 Page 1 of 1
DATED : June 14, 2005
INVENTOR(S) : Masaru Ishikawa It is certified that error appears in the above-identified patent and that said Letters Patent is hereby corrected as shown below:

Column 7,
Line 29, replace "an image transmitting panel placed to and apart from said" with -- an image transmitting panel placed parallel to and apart from said --.

Signed and Sealed this

Fourth Day of April, 2006

JON W. DUDAS
*Director of the United States Patent and Trademark Office*